(12) United States Patent
Imai et al.

(10) Patent No.: US 6,550,677 B1
(45) Date of Patent: Apr. 22, 2003

(54) CODE READER AND CODE READING METHOD FOR READING HOLE CODE

(75) Inventors: Ryo Imai, Saitama (JP); Kazuo Miyaji, Saitama (JP); Naoshi Sugiyama, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/577,833

(22) Filed: May 25, 2000

(30) Foreign Application Priority Data

May 28, 1999 (JP) ............................. 11-150538

(51) Int. Cl.⁷ ............................ G06K 7/10; G06K 7/14
(52) U.S. Cl. ..................... 235/454; 235/494; 235/491; 235/462.01; 235/462.05
(58) Field of Search ........................ 235/454, 491, 235/494, 900, 901, 462.01, 462.05

(56) References Cited

U.S. PATENT DOCUMENTS

| | | | |
|---|---|---|---|
| 4,449,042 A | * | 5/1984 | Hampson et al. ........... 235/454 |
| 4,625,101 A | * | 11/1986 | Hinks et al. ................. 152/523 |
| 5,216,234 A | * | 6/1993 | Bell ............................. 194/214 |
| 5,808,284 A | * | 9/1998 | Domanik ................ 235/462.01 |
| 5,971,276 A | * | 10/1999 | Sano et al. ............ 235/462.01 |
| 6,122,245 A | * | 9/2000 | Kondo et al. ............. 369/275.4 |
| 6,295,262 B1 | * | 9/2001 | Kusumoto et al. ...... 235/462.25 |

FOREIGN PATENT DOCUMENTS

JP    403071385 A    *  3/1991    ................. 235/491

* cited by examiner

Primary Examiner—Michael G. Lee
Assistant Examiner—Steven S. Paik
(74) Attorney, Agent, or Firm—Sughrue Mion, PLLC

(57) ABSTRACT

A roll thermosensitive recording material is wound about a winding core, which has a hole code disposed in an end surface. The end surface has a black color. The hole code includes plural holes formed in the end surface at a regular depth, and has a hole base face with a white color. In a code reader, a code detecting photo sensor is set so as to adapt a detection distance thereof to the hole base face, and detects the white color from the hole base face, to read the holes. A code inspecting photo sensor is set so as to adapt a detection distance thereof to the end surface, for inspecting the end surface. The winding core is detected unacceptable if the code inspecting photo sensor detects the white color from the end surface.

21 Claims, 6 Drawing Sheets

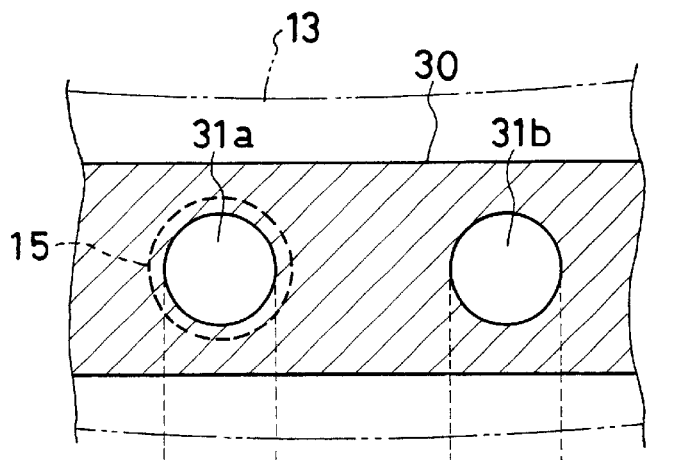
FIG. 5A
FIG. 5B PHOTO SENSOR 21
FIG. 5C PHOTO SENSOR 22
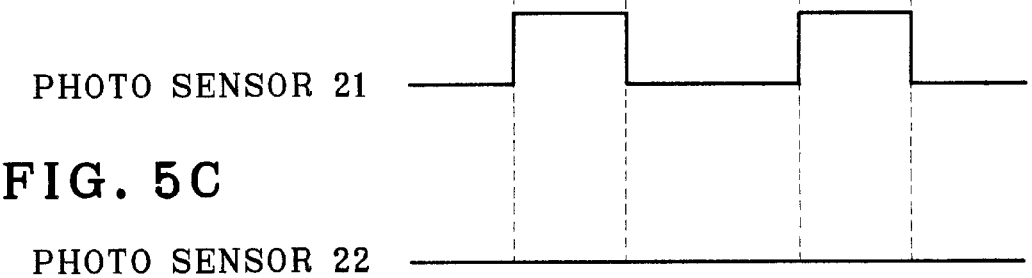
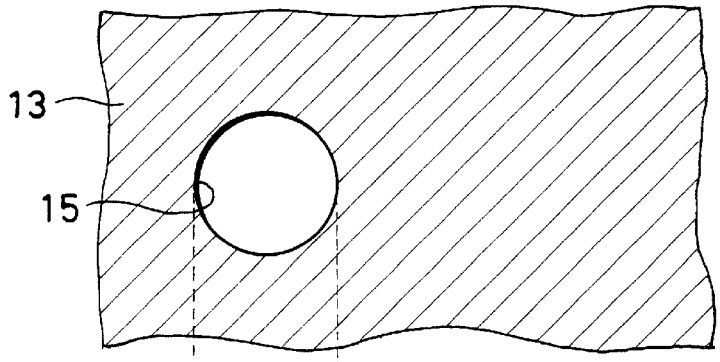
FIG. 5D
FIG. 5E PHOTO SENSOR 21
FIG. 5F PHOTO SENSOR 22

FIG. 7
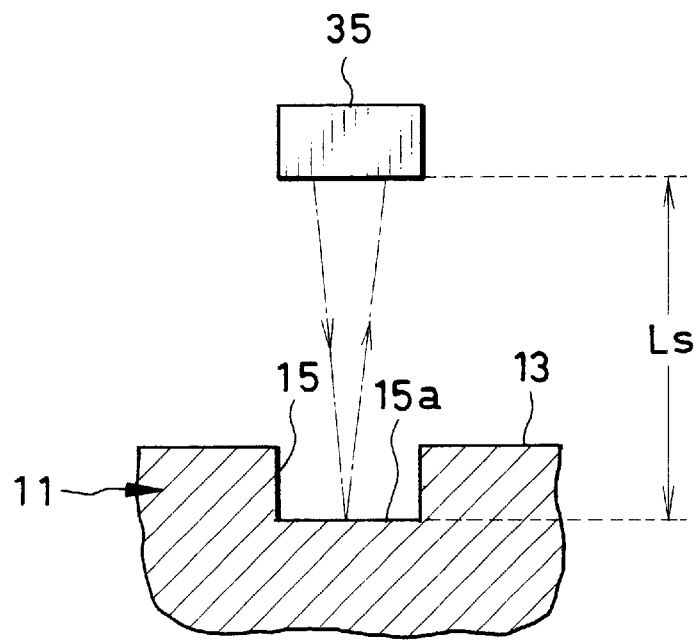
FIG. 8A
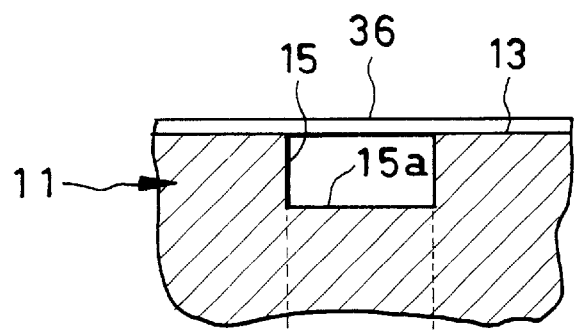
FIG. 8B
SENSOR SIGNAL LEVEL

CODE READER AND CODE READING METHOD FOR READING HOLE CODE

BACKGROUND OF THE INVENTION

1. Field of the Invention

The present invention relates to a code reader and code reading method for reading a hole code. More particularly, the present invention relates to a code reader and code reading method in which an object to be handled in an apparatus is provided with a hole code for representing information of the object, and in which the hole code is read for checking the object.

2. Description Related to the Prior Art

It is necessary in a thermal printer to use a certain type of thermosensitive recording material acceptable to settings of the thermal printer, because the imaging density is determined according to heating characteristics of a thermal head and coloring characteristics of the recording material. There is a roll recording material in which the recording material in a continuous shape is wound about a winding core in a cylindrical shape. The roll recording material has information printed on either of end surfaces of the winding core. The information represents a type, coloring characteristics, a manufacturer's name of the roll recording material. Any kind of the information is encoded, and read by a code reader provided in the thermal printer at the time of starting the use of the roll recording material in the thermal printer. If the type and the like of the recording material is detected acceptable, the thermal printer is enabled to operate. If not, a display panel is caused to indicate an error, and the thermal head is disabled to operate even upon inputting of a start command signal.

A bar code is well known in the art of codes to represent information of various kinds, and consists of a combination of black and white bars arranged in a serial form. Also, a hole code is known, and consists of holes arranged serially and formed with a regular depth with reference to a reference surface. In a code reader for the hole code, a distance measuring sensor is incorporated, and has a distance measuring range covering the reference surface and a base face of the holes. The reference surface and the base face of the holes are both white. The reference surface and holes are discerned according to distances detected by the distance measuring sensor.

However, the distance measuring sensor is remarkably expensive. There is a problem in raising the cost of the code reader.

If a certain user intends to use the roll recording material of a type different from the genuine type, he or she may attach white paper to a portion including the holes to work the hole code fraudulently. With such a worked roll recording material, the distance measuring sensor is likely to judge that the holes with the white paper is the reference surface. There is no known technique for coping with such a fraud in the conventionally used code reader.

SUMMARY OF THE INVENTION

In view of the foregoing problems, an object of the present invention is to provide a code reader and code reading method for reading a hole code in which fraudulent working of a hole code can be detected reliably even with a simple construction.

In order to achieve the above and other objects and advantages of this invention, a code reader is provided for reading a code from an object surface of an object, the object surface having a low reflectance, the code including plural holes formed in the object surface at a regular depth, and having a hole base face, the hole base face having a high reflectance. In the code reader, a code detecting photo sensor is set so as to adapt a detection distance thereof to the hole base face, for detecting the high reflectance from the hole base face, to read the holes. A code inspecting photo sensor is set so as to adapt a detection distance thereof to the object surface, for inspecting the object surface, the object being detected unacceptable if the code inspecting photo sensor detects the high reflectance from the object surface.

In a preferred embodiment, a sensor signal is generated from respectively the code detecting photo sensor and the code inspecting photo sensor, is at an effective detection level in response to detection of the high reflectance at the detection distance, and is at a non-detection level when in a non-detection state without the detection of the high reflectance at the detection distance. Furthermore, a controller causes the code inspecting photo sensor to check the object surface in a direction of arranging the plural holes, and detects the object acceptable if the sensor signal from the code inspecting photo sensor is kept at the non-detection level continuously while the object surface is checked, to retrieve the sensor signal from the code detecting photo sensor.

The code inspecting photo sensor and the code detecting photo sensor respectively include a light projector element for projecting a sensor beam to the object surface or the hole base face. A light receiver element detects the high reflectance upon receiving the sensor beam reflected by the object surface or the hole base face, and for outputting the sensor signal at the effective detection level.

Furthermore, a binarizing circuit compares the sensor signal from the code inspecting photo sensor and the code detecting photo sensor with a reference level, and judges that the sensor signal is at the non-detection level if at a level lower than the reference level, and is at the effective detection level if at a level equal to or higher than the reference level.

The object has a cylindrical shape, and the object surface is an end surface of the object. The hole arranging direction is a rotational direction and defined along an arc about a center of the end surface. Furthermore, a rotating mechanism rotates the object in the hole arranging direction. The controller detects the end surface acceptable if the sensor signal from the code inspecting photo sensor is kept at the non-detection level during one rotation of the object.

The code inspecting photo sensor and the code detecting photo sensor respectively include a light projector lens for focusing the sensor beam on the object surface or the hole base face. A light receiver lens focuses on the light receiver element the sensor beam being reflected.

The object is a winding core for winding continuous sheet material thereabout.

The object surface is black, and the hole base face is white.

According to another aspect of the present invention, a code reader reads a code from an object surface of an object, the code including plural holes formed in the object surface at a regular depth, and having a hole base face, the hole base face having a high reflectance. In the code reader, a photo sensor is set so as to adapt a detection distance thereof to the hole base face, for outputting a sensor signal, the sensor signal being at an effective detection level in response to detection of the hole base face in the photo sensor, and being at a non-detection level when in a non-detection state in the photo sensor without the detection of the hole base face.

In a preferred embodiment, a controller causes the photo sensor to check the object surface in a direction of arranging the plural holes, and detects the object unacceptable if the sensor signal is kept at the non-detection level continuously while the object surface is checked.

The object surface has the high reflectance. When the photo sensor is opposed to a portion of the object surface offset from the holes, the sensor signal is at the non-detection level.

The photo sensor includes a light projector element for projecting a sensor beam to the hole base face. A light receiver element outputs the sensor signal at the effective detection level upon receiving the sensor beam reflected by the hole base face.

Furthermore, a binarizing circuit compares the sensor signal with a reference level, and judges that the sensor signal is at the non-detection level if at a level lower than the reference level, and is at the effective detection level if at a level equal to or higher than the reference level.

The object has a cylindrical shape, and the object surface is an end surface of the object. The hole arranging direction is a rotational direction and defined along an arc about a center of the end surface. Furthermore, a rotating mechanism rotates the object in the hole arranging direction. The controller detects the end surface unacceptable if the sensor signal is kept at the non-detection level during one rotation of the object.

The object surface and the hole base face are white.

BRIEF DESCRIPTION OF THE DRAWINGS

The above objects and advantages of the present invention will become more apparent from the following detailed description when read in connection with the accompanying drawings, in which:

FIG. 5A is an explanatory view in elevation, partially cut away, illustrating a state where the hole code is fraudulently worked with patterned paper;

FIG. 5B is a timing chart illustrating a sensor signal from the code inspecting photo sensor checking the paper of FIG. 5A;

FIG. 5C is a timing chart illustrating a sensor signal from the code detecting photo sensor checking the paper of FIG. 5A;

FIGS. 5D, 5E and 5F are an explanatory view and two timing charts illustrating the same as FIGS. 5A, 5B and 5C but in an acceptable state of the hole code without a fraud;

FIG. 7 is an explanatory view in elevation, illustrating a single photo sensor in another preferred code reader, together with a hole code;

FIG. 8A is an explanatory view in elevation, illustrating a state where the hole code is fraudulently worked with paper; and FIG. 8B is a timing chart illustrating a sensor signal from the photo sensor checking the paper of FIG. 8A.

DETAILED DESCRIPTION OF THE PREFERRED EMBODIMENT(S) OF THE PRESENT INVENTION

Figure 1:
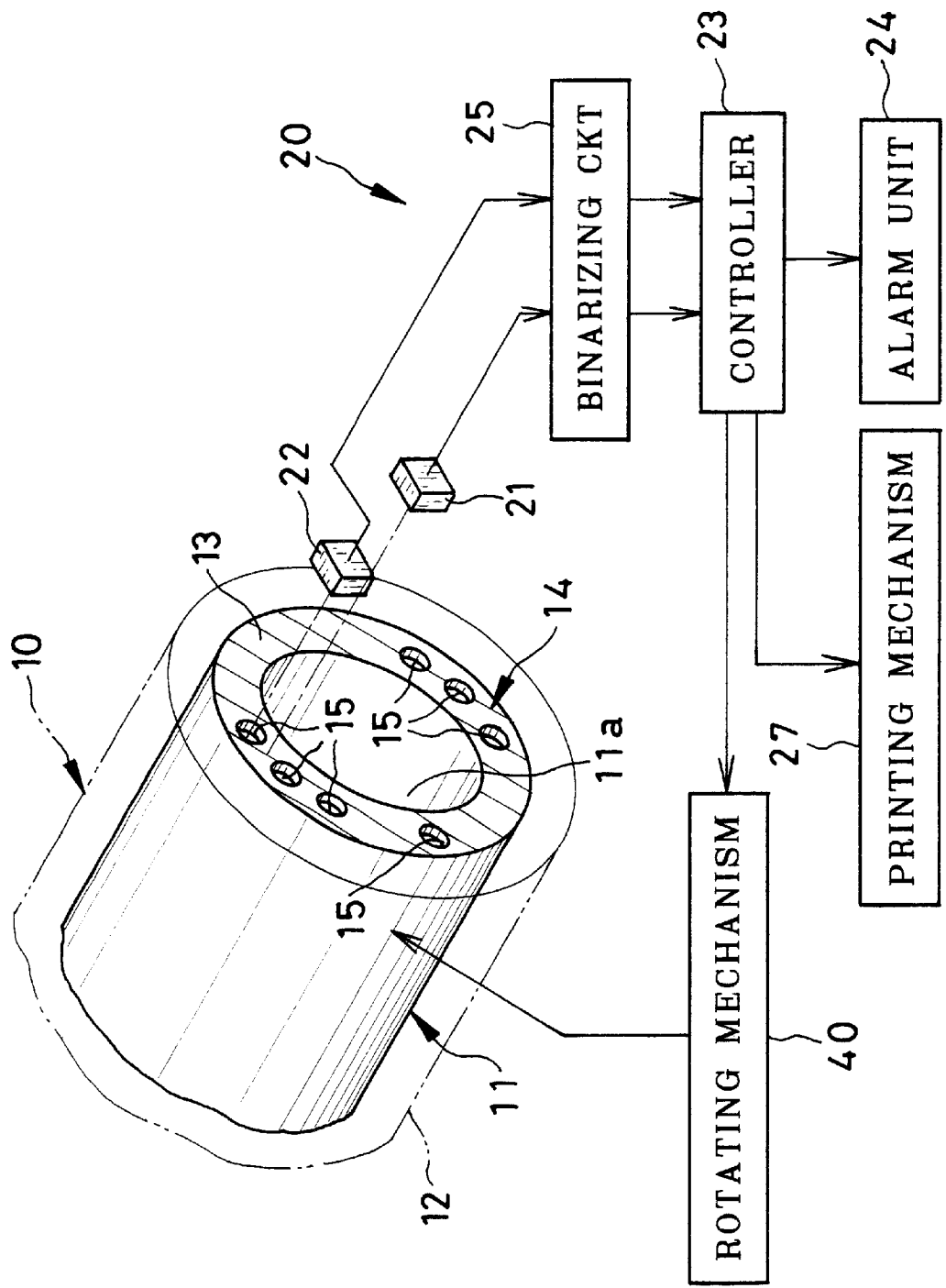
FIG. 1 is an explanatory view in a perspective and a diagram, illustrating a code reader together with a hole code in roll recording material.
Figure 2:
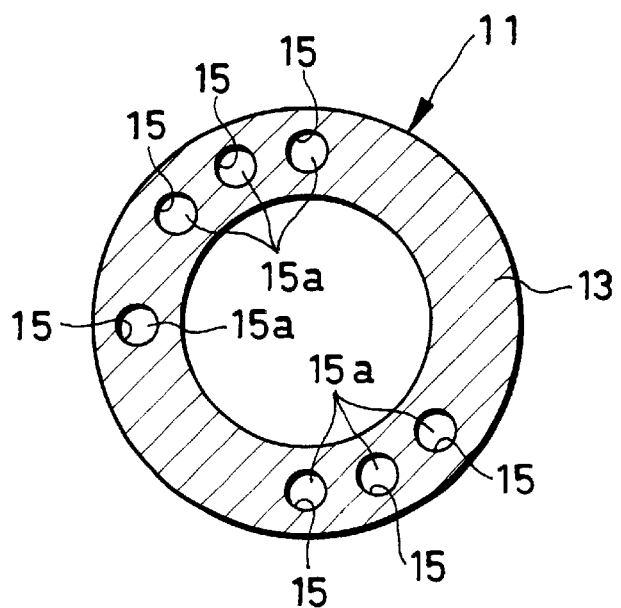
FIG. 2 is a side elevation illustrating an end surface of a winding core with the hole code.

In FIG. 1, a recording material loading section in a thermal printer is illustrated, and is provided with a code reader of the present invention. A roll recording material 10 is constituted by a winding core 11 as an object, and thermosensitive recording material 12 as continuous sheet material. The winding core 11 has a cylindrical shape and formed from plastic material or cardboard. A central cylindrical space 11a is defined inside the winding core 11, and receives insertion of a rotary shaft of a rotating mechanism 40. The roll recording material 10 is caused by the rotary shaft to rotate in the course of printing. In FIG. 2, an end surface 13 of the winding core 11 is an object surface or reference surface with the black color. A hole code 14 is disposed in the end surface 13. Plural holes 15 constitute the hole code 14, and have a constant depth, and are arranged on one common arc of a circle defined about a rotational axis of the winding core 11. Each of the holes 15 has a hole base face 15a with the white color. In short, the hole code 14 constitutes a bar code of which white bars are the holes 15 with high reflectance, and black bars are portions between the holes 15 with low reflectance. The black bars have two lengths that represent two signals. Information of the hole code 14 includes the type, heat sensitivity and manufacturer of the recording material 12.

A code reader 20 includes a code inspecting photo sensor 21 and code detecting photo sensor 22 each opposed to the end surface 13 of the winding core 11, and reads the hole code 14 while the roll recording material 10 rotates. The code reader 20 also includes a controller 23, alarm unit 24 and binarizing circuit 25.

Figure 3B:
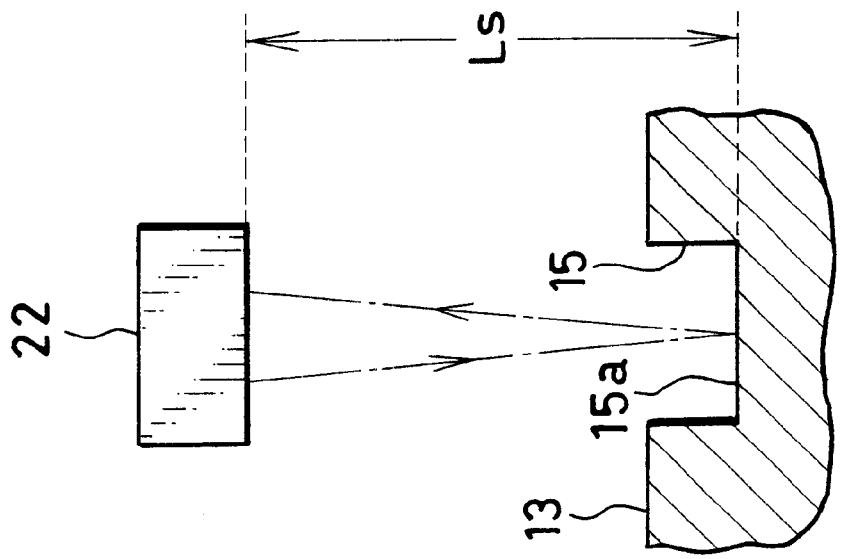
FIG. 3B is an explanatory view illustrating a code detecting photo sensor together with the hole code.
Figure 3A:
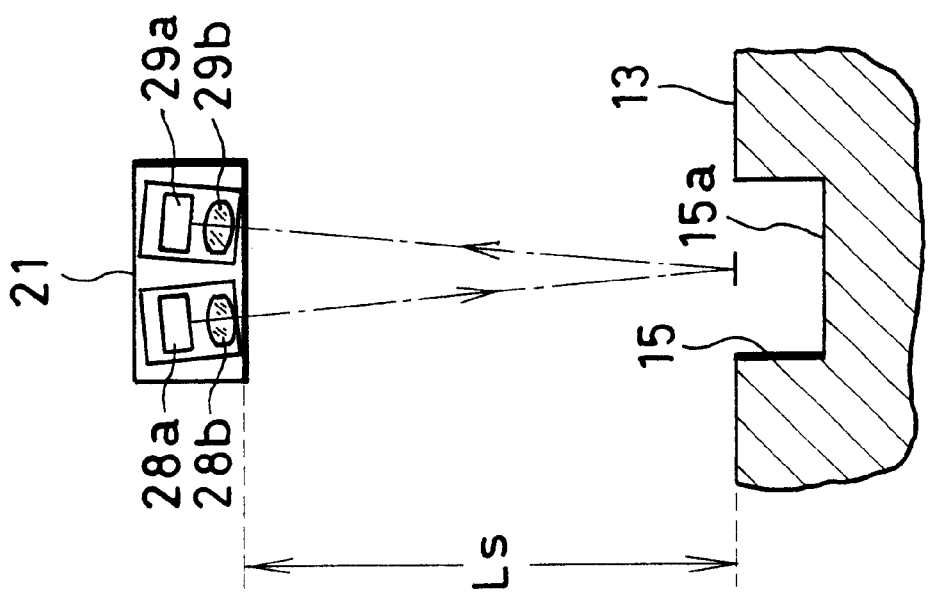
FIG. 3A is an explanatory view illustrating a code inspecting photo sensor together with the hole code.

In FIGS. 3A and 3B, the code inspecting photo sensor 21 consists of a combination of a light projector section and light receiver section. The light projector section is constituted by a light projector element 28a and light projector lens 28b. The light receiver section is constituted by a light receiver element 29a and light receiver lens 29b. The code inspecting photo sensor 21 has a detection distance Ls, and is optically focused on the end surface 13 that is a reference surface. Also, the code detecting photo sensor 22 is a reflection type, and focused on the hole base face 15a of the holes 15.

Sensor signals from the code inspecting photo sensor 21 and code detecting photo sensor 22 are converted by the binarizing circuit 25 into binary signals, and then sent to the controller 23. The controller 23 reads information in the hole code 14 according to the sensor signal from the code detecting photo sensor 22. Also, the controller 23 checks existence of fraudulent working of the hole code 14 according to the sensor signal from the code inspecting photo sensor 21, and drives a printing mechanism 27 or the alarm unit 24 according to a result of the check. If the hole code 14 has been worked fraudulently, the alarm unit 24 indicates information of an error. The printing mechanism 27 is inhibited from operating for printing. Examples of the alarm unit 24 are a liquid crystal display panel, light-emitting diodes (LED) and any suitable indicator for visible signals, and a buzzer, chime and any suitable sound generator for audible signals.

Figure 4:
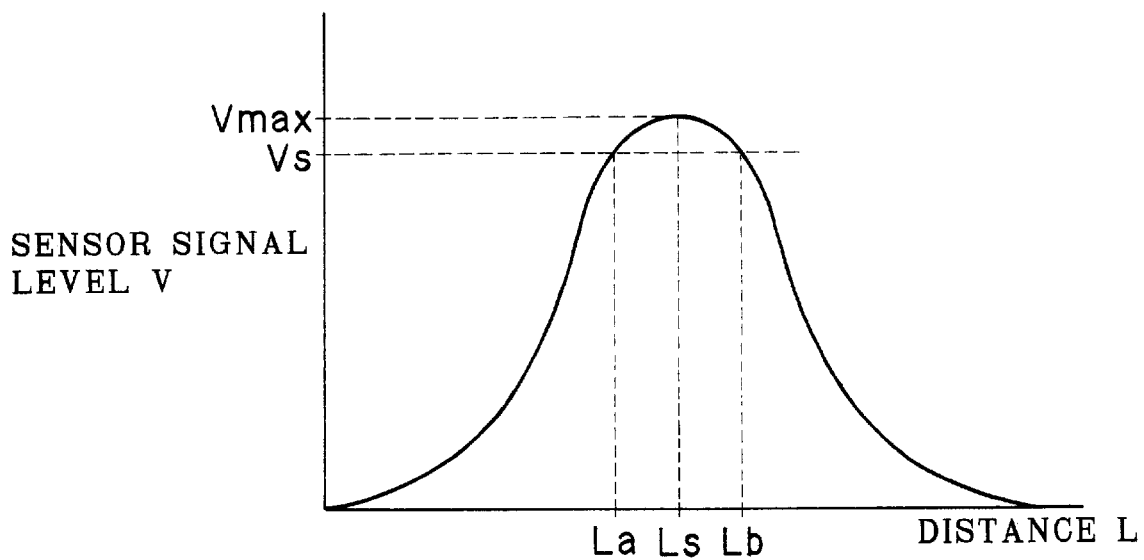
FIG. 4 is a graph illustrating a relationship between a distance L and an output level V of each sensor.

An output level of the sensor signal from the code inspecting photo sensor 21 and code detecting photo sensor 22 is changed according to a distance to a white surface. As depicted in FIG. 4, the output level V of the sensor signal comes up to the maximum output level Vmax when the distance L to the white surface is equal to the detection distance Ls. According to an increase in a difference between the distance L and detection distance Ls, the output level V of the sensor signal decreases. Note that the detection distance Ls is predetermined according to each particular type of the reflection photo sensor.

The sensor signals from the code inspecting photo sensor 21 and code detecting photo sensor 22 are compared with a reference level Vs (See FIG. 4) as a threshold value by the binarizing circuit 25 such as a comparator, and thus converted to the binary signals. The output level V of the sensor signal from the code inspecting photo sensor 21, if equal to or higher than the reference level Vs, is converted into an H level signal corresponding to a value of "1", and if lower than the reference level Vs, is converted into an L level signal corresponding to a value of "0". The sensor signal from the code detecting photo sensor 22 is converted in the same manner. The code inspecting photo sensor 21 and code detecting photo sensor 22 are optically focused on a position with the detection distance Ls. However, positions in a range from a lower limit distance La to an upper limit distance Lb can be detected by the code inspecting photo sensor 21 and code detecting photo sensor 22 with a tolerable range in addition to the detection distance Ls.

According to the above construction, the code inspecting photo sensor 21 is capable of detecting white portions in the end surface 13, but not capable of detecting the hole base face 15a of the holes 15. Referring to FIG. 5A, let paper 30 have white indicia 31a and 31b printed thereon. If the paper 30 is attached to the end surface 13 by positioning the white indicia 31a at one of the holes 15 and the white indicia 31b at a black portion of the end surface 13, then the sensor signal of the code inspecting photo sensor 21 comes to an "H" level signal when the code inspecting photo sensor 21 is opposed to the white indicia 31a and 31b. See FIG. 5B. In FIG. 5C, the sensor signal of the code detecting photo sensor 22 remains an "L" level signal. In FIG. 5D, the end surface 13 in an acceptable state without the paper 30 is llustrated. In FIG. 5E, the sensor signal of the code inspecting photo sensor 21 for the end surface 13 of FIG. 5D remains an "L" level signal. In FIG. 5F, the code detecting photo sensor 22 reads the code, as it detects the hole base face 15a of the holes 15 and because of the black color of the end surface 13.

Figure 6:
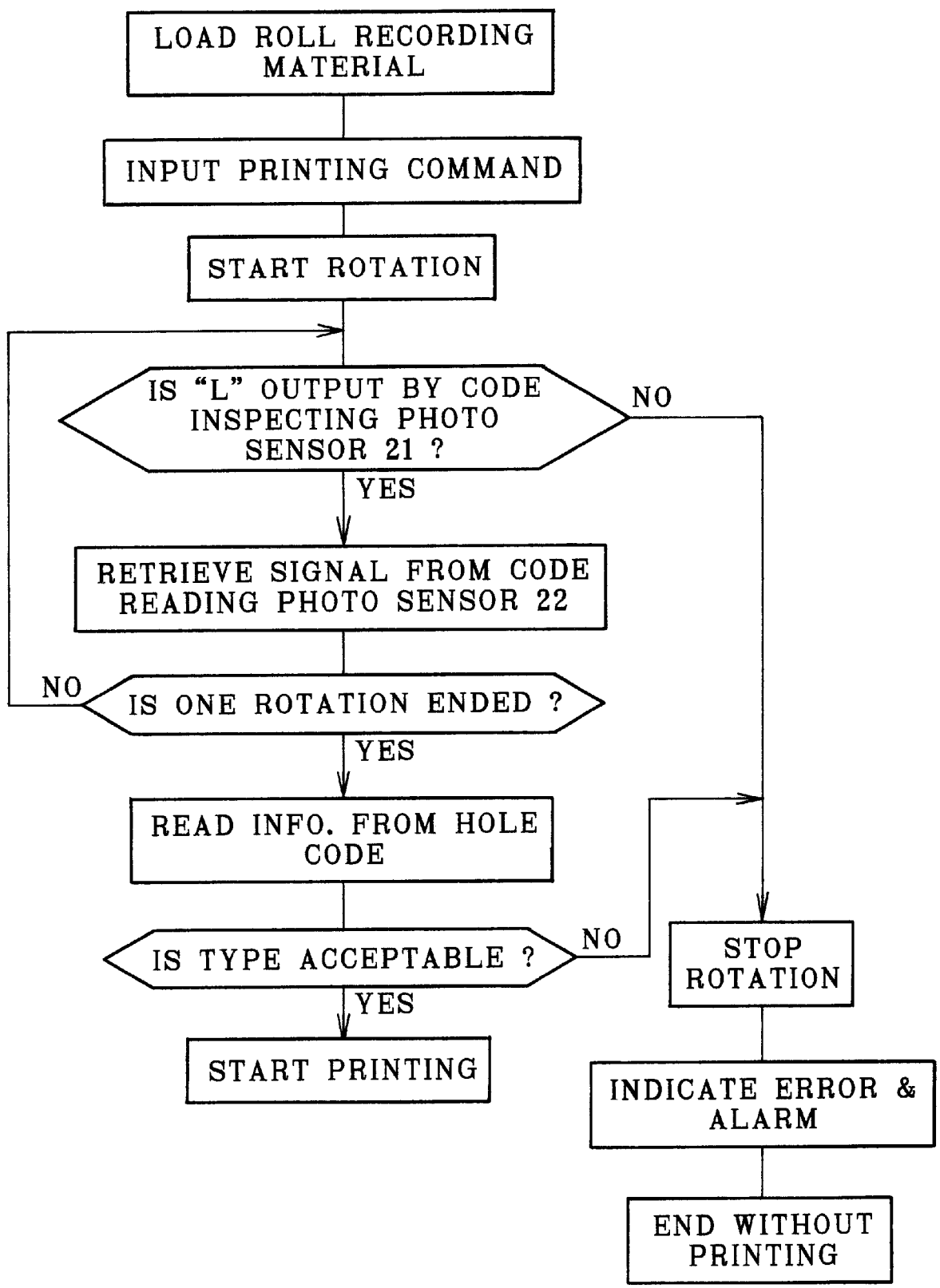
FIG. 6 is a flow chart illustrating operation of the code reading.

The roll recording material 10 is set in the thermal printer. A command signal for starting printing is input. Then the hole code is read according to the sequence illustrated in FIG. 6. At first, a motor in the rotating mechanism 40 is driven to rotate the roll recording material 10, to start feeding the recording material 12. During the feeding, the hole code 14 in the end surface 13 of the winding core 11 rotates past the code inspecting photo sensor 21 and code detecting photo sensor 22. Sensor signals from the code inspecting photo sensor 21 and code detecting photo sensor 22 are converted by the binarizing circuit 25 into the L or H level signal, which is sent into the controller 23.

The controller 23 monitors the sensor signal output by the code inspecting photo sensor 21 while the roll recording material 10 makes one rotation. If the code inspecting photo sensor 21 outputs an "H" level signal during the one rotation, it is judged that a white portion exists in the end surface 13 of the winding core 11. The controller 23 recognizes a fraudulent working of the hole code 14. Then the controller 23 drives the alarm unit 24 to inform an error or unacceptability in the type of the roll paper set in the printer. Furthermore, the controller 23 sends a signal to the printing mechanism 27, and stops a thermal head from starting its printing operation. Also, the printing mechanism 27 stops the motor in the rotating mechanism 40, to stop rotation of the roll recording material 10.

If in turn the sensor signal from the code inspecting photo sensor 21 is unchanged as L level signal during one rotation of the roll recording material 10, then the controller 23 judges that the hole code 14 is proper without fraud.

On the other hand, the sensor signal from the code detecting photo sensor 22 is converted into a binary signal, and sent to the controller 23. If it is judged that there is no fraudulent working or unacceptability, then the information of the hole code 14 is read to detect the type, heat sensitivity and the like of the roll recording material 10. If the type of the roll recording material 10 is not acceptable, then the alarm unit 24 is caused to inform an error in the type of the roll recording material 10 as a warning. Also, the printing is stopped. Information of the heat sensitivity is used for adjusting heat energy generated by the thermal head.

In the present embodiment, the end surface 13 is black. The hole base face 15a is white. However, it is possible that both the end surface 13 and hole base face 15a are white. For such a construction, it is necessary to determine the focal length of the code detecting photo sensor 22 and the depth of the holes 15 suitably so that the code detecting photo sensor 22 will not detect white portions in the end surface 13.

In the present embodiment, the hole code 14 is both inspected and read in the course of one rotation. However, two rotations may be made, one for inspecting the hole code 14 at the code inspecting photo sensor 21 and the other for reading the hole code 14 at the code detecting photo sensor 22.

In the above embodiment, the code inspecting photo sensor 21 and the code detecting photo sensor 22 are structurally the same, and secured on a support plate in positions at different levels. However, the code inspecting photo sensor 21 and the code detecting photo sensor 22 may have different detection distance Ls, and may be supported at an equal level.

FIGS. 7 and 8 are referred to now for describing another preferred embodiment. Elements similar to those of the above embodiment are designated with identical reference numerals. In FIG. 7, both the end surface 13 of the winding core 11 and the hole base face 15a of the holes 15 are white. A single photo sensor 35 of a reflection type is disposed to face the winding core 11. The photo sensor 35 is a reflection type, and focused on the hole base face 15a of the holes 15.

The photo sensor 35 is capable of detecting the hole base face 15a of the holes 15 but not capable of detecting white portions in the end surface 13. FIG. 8A illustrates a fraudulent structure with white paper 36 attached to the end surface 13. The holes 15 are closed by the white paper 36. In FIG. 8B, the photo sensor 35 outputs a sensor signal constantly at the L level, and cannot detect the holes 15. If the hole code 14 is proper, the photo sensor 35 becomes opposed to the holes 15 and generates the H level signal. If the photo sensor 35 generates the L level signal without a change during one rotation of the roll, it is detected that the hole code 14 has been fraudulently worked. Note that the binarizing circuit 25 in FIG. 2 is used in cooperation with the photo sensor 35. The H level signal exactly represents the hole base face 15a properly shaped with the constant depth.

Note that the present embodiment can be used with the roll recording material 10 having the hole code 14 in FIG. 2. Also, the hole base face 15a according to the embodiment of FIGS. 7 and 8 can have any suitable color with sufficient reflectance. Furthermore, the hole base face 15a may have a color different from a color of the end surface 13.

In the above embodiments, the holes 15 are arranged on the common arc. However, the hole code 14 may include the holes 15 arranged on a straight line. The photo sensors 21 and 22 and the hole code 14 may be moved straight in a manner relative to each other. Furthermore, at the time of supply of the recording material, the roll recording material may be rotated backwards, may be tightened by absorbing looseness, and may be rotated in the forward direction for the start of the supply. It is possible to read the hole code 14 in the course of the backward rotation of the roll recording material.

Furthermore, the code reader of the present invention can be also used in any predetermined objects having a hole code, such as a roll of ink film for thermal transfer recording.

In the above embodiments, the hole base face 15a of the holes 15 is white. However, the hole base face 15a may be a mirror surface with a silver color.

In the above embodiments, the end surface 13 has the hole code 14 constituted by the holes 15. Alternatively, the end surface 13 may have a projection code constituted by plural projections. Top faces of the projections may be colored with white. A code reader of the present invention may be used with a bar code in which white bars have a height or depth different from that of black bars.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A code reader for optically reading a code from an object surface of an object, comprising:

said code including plural holes formed in said object surface, said object surface being provided with a low optical reflectance, said holes having a hole base face at a regular depth from said object surface, said hole base face being provided with a high optical reflectance;

a code detecting photo sensor for detecting optical reflectance from said hole base face by scanning said code, to output a sensor signal for reading of said code if said optical reflectance is said high reflectance; and a code inspecting photo sensor for detecting optical reflectance from said object surface by scanning said code, to output a sensor signal for judging that said code is unacceptable if said optical reflectance is said high reflectance.

2. The code reader as defined in claim 1, wherein said code detecting photo sensor is set so as to adapt a detection distance thereof to said hole base face for said high optical reflectance, said code inspecting photo sensor is set so as to adapt a detection distance thereof to said object surface for said high optical reflectance, said sensor signal from respectively said code detecting photo sensor and said code inspecting photo sensor is at an effective detection level in response to detection of said high reflectance at said detection distance, and is at a non-detection level when in a non-detection state without said detection of said high reflectance at said detection distance;

further comprising a controller for detecting said object acceptable if said sensor signal from said code inspecting photo sensor is kept at said non-detection level continuously while said code inspecting photo sensor scans said code, to retrieve said sensor signal from said code detecting photo sensor.

3. The code reader as defined in claim 2, wherein said code inspecting photo sensor and said code detecting photo sensor respectively include:

a light projector element for projecting a sensor beam to said object surface or said hole base face; and a light receiver element for detecting said high reflectance upon receiving said sensor beam reflected by said object surface or said hole base face, and for outputting said sensor signal at said effective detection level.

4. The code reader as defined in claim 3, further comprising a binarizing circuit for comparing said sensor signal from said code inspecting photo sensor and said code detecting photo sensor with a reference level, and for judging that said sensor signal is at said non-detection level if at a level lower than said reference level, and is at said effective detection level if at a level equal to or higher than said reference level.

5. The code reader as defined in claim 4, wherein said object has a cylindrical shape, and said object surface is an end surface of said object;

said plural holes are arranged along an arc about a center of said end surface;

further comprising a rotating mechanism for rotating said object about said center;

said controller detects said code acceptable if said sensor signal from said code inspecting photo sensor is kept at said non-detection level during one rotation of said object.

6. The code reader as defined in claim 4, wherein said code inspecting photo sensor and said code detecting photo sensor respectively include:

a light projector lens for focusing said sensor beam on said object surface or said hole base face; and a light receiver lens for focusing on said light receiver element said sensor beam being reflected.

7. The code reader as defined in claim 4, wherein said object is a winding core for winding continuous sheet material thereabout.

8. The code reader as defined in claim 4, wherein said object surface is black, and said hole base face is white.

9. The code reader of claim 1, wherein the object includes said object surface as part of an end face of a tubular form.

10. The code reader of claim 9, wherein a recording material is disposed about the object in a direction perpendicular to a plane containing said object surface.

11. The code reader of claim 1, wherein said plural holes are contiguous with said object surface, such that the plural holes comprise voids in said object surface.

12. A code reading method of optically reading a code from an object surface of an object, said code including plural holes formed in said object surface, said code reading method comprising steps of:

said object surface being provided with a low optical reflectance;

said holes having a hole base face at a regular depth from said object surface, said hole base face being provided with a high optical reflectance;

scanning said code with a code detecting photo sensor and a code inspecting photo sensor relatively;

if said code detecting photo sensor detects that optical reflectance of said hole base face is said high reflectance, reading said holes, said code being read according to arrangement of said holes; and if said code inspecting photo sensor detects that optical reflectance of said object surface is said high reflectance, judging that said code is unacceptable.

13. The method of claim 12, wherein the object includes said object surface as part of an end face of a tubular form.

14. The method of claim 13, wherein a recording material is disposed about the object in a direction perpendicular to a plane containing said object surface.

15. The method of claim 12, wherein said plural holes are contiguous with said object surface, such that the plural holes comprise voids in said object surface.

16. A code reader for optically reading a code from an object surface of an object comprising:

said code including plural holes formed in said object surface, said holes having a hole base face at a regular depth from said object surface, said hole base face being provided with a high optical reflectance;

a photosensor, set so as to adapt a detection distance thereof to said hole base face, for outputting a sensor signal, said sensor signal being at an effective detection level in response to detection of said hole base face, and being at a non-detection level when in a non-detection state without said detection of said hole base face, wherein the object includes said object surface as part of an end face of a tubular form.

17. The code reader of claim 16, wherein a recording material is disposed about the object in a direction perpendicular to a plane containing said object surface.

18. A code reader for optically reading a code from an object surface of an object comprising:

said code including plural holes formed in said object surface, said holes having a hole base face at a regular depth from said object surface, said hole base face being provided with a high optical reflectance;

a photosensor, set so as to adapt a detection distance thereof to said hole base face, for outputting a sensor signal, said sensor signal being at an effective detection level in response to detection of said hole base face, and being at a non-detection level when in a non-detection state without said detection of said hole base face, wherein said plural holes are contiguous with said object surface, such that the plural holes comprise voids in said object surface.

19. A code reading method of optically reading a code from an object surface of an object, said code including plural holes formed in said object surface, said code reading method comprising a step of:

said holes having a hole base face at a regular depth from said object surface, said hole base face being provided with a high optical reflectance;

scanning said code with a photo sensor relatively, for reading said holes if said photo sensor detects that optical reflectance of said hole base face is said high reflectance, said code being read according to arrangement of said holes, said photo sensor outputting a sensor signal, said sensor signal being at an effective detection level in response to detection of said hole base face, and being at a non-detection level when in a non-detection state without said detection of said hole base face, wherein the object includes said object surface as part of an end face of a tubular form.

20. The method of claim 19, wherein a recording material is disposed about the object in a direction perpendicular to a plane containing said object surface.

21. A code reading method of optically reading a code from an object surface of an object, said code including plural holes formed in said object surface, said code reading method comprising a step of:

said holes having a hole base face at a regular depth from said object surface, said hole base face being provided with a high optical reflectance;

scanning said code with a photo sensor relatively, for reading said holes if said photo sensor detects that optical reflectance of said hole base face is said high reflectance, said code being read according to arrangement of said holes, said photo sensor outputting a sensor signal, said sensor signal being at an effective detection level in response to detection of said hole base face, and being at a non-detection level when in a non-detection state without said detection of said hole base face, wherein said plural holes are contiguous with said object surface, such that the plural holes comprise voids in said object surface.

* * * * *